(12) United States Patent
Kurihara (10) Patent No.: US 9,880,489 B2
(45) Date of Patent: Jan. 30, 2018

(54) LIGHT SCANNING DEVICE THAT ENSURES IMPROVED FLEXIBLE LOCATION OF COMPONENT FOR REGULATING EXPANDED WIDTHS OF LIGHT BEAM

(71) Applicant: KYOCERA Document Solutions Inc., Osaka (JP)

(72) Inventor: Takayuki Kurihara, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/420,497

(22) Filed: Jan. 31, 2017

(65) Prior Publication Data

US 2017/0227882 A1  Aug. 10, 2017

(30) Foreign Application Priority Data

Feb. 8, 2016 (JP) ................................. 2016-022065

(51) Int. Cl.
*G03G 15/04* (2006.01)

(52) U.S. Cl.
CPC .............................. *G03G 15/04036* (2013.01)

(58) Field of Classification Search
CPC ............................................... G03G 15/04036
See application file for complete search history.

(56) References Cited

U.S. PATENT DOCUMENTS

| 2003/0085346 A1 | 5/2003 | Yamawaki | 250/234 |
| 2009/0141326 A1* | 6/2009 | Tamaru | G03G 15/01 359/196.1 |

FOREIGN PATENT DOCUMENTS

JP  2003-107381 A  4/2003

* cited by examiner

*Primary Examiner* — Clayton E Laballe
*Assistant Examiner* — Jas Sanghera
(74) *Attorney, Agent, or Firm* — Stein IP, LLC (57) ABSTRACT

A light scanning device includes a light source, a deflector, a reflection mirror, and a light width regulating portion. The light source includes a plurality of light-emitting elements located at intervals one another. The deflector deflects to scan by reflecting a plurality of light beams. The plurality of light beams are emitted from the respective light-emitting elements. The reflection mirror is located in an optical path between the light source and the deflector and guides the plurality of light beams emitted from the plurality of light-emitting elements to the deflector. The light width regulating portion regulates widths of the plurality of light beams reflected by the reflection mirror in a main-scanning direction. The light width regulating portion is located adjacent to a reflecting surface of the reflection mirror and includes a pair of regulating wall portions located opposed one another in the main-scanning direction.

5 Claims, 6 Drawing Sheets

X-Direction

LIGHT SCANNING DEVICE THAT ENSURES IMPROVED FLEXIBLE LOCATION OF COMPONENT FOR REGULATING EXPANDED WIDTHS OF LIGHT BEAM

INCORPORATION BY REFERENCE

This application is based upon, and claims the benefit of priority from, corresponding Japanese Patent Application No. 2016-022065 filed in the Japan Patent Office on Feb. 8, 2016, the entire contents of which are incorporated herein by reference.

BACKGROUND

Unless otherwise indicated herein, the description in this section is not prior art to the claims in this application and is not admitted to be prior art by inclusion in this section.

Typically, a light scanning device is employed for exposure of image carriers such as a photoreceptor drums in an image forming apparatus such as a printer and a copier. A typical light scanning device includes a light source, and a polygon mirror that reflects a light beam emitted from the light source to scan surfaces of the image carriers in a main-scanning direction.

Image forming apparatuses in recent years have been achieving a high printing speed and a high resolution. This increases a desire for a higher scanning speed of a light scanning device. For the desire for the higher speed, increase of a rotation speed of a polygon mirror is considered. However, the increase of the rotation speed of the polygon mirror is restricted by various causes such as a performance of a motor that drives the polygon mirror, and heat of bearing. Thus, it has been developed that disposing a plurality of light-emitting elements in one light source to achieve a multibeam-type light scanning device that emits a plurality of light beams to image carriers from the one light source.

This light scanning device typically includes an aperture that regulates an expanded width in a direction corresponding to the main-scanning direction of the respective light beams emitted from the light source. The aperture includes a slit-shaped hole bored on a plate-shaped material. The aperture is located, for example, at a position at which the respective light beams intersect one another.

While the above-described light scanning device has a configuration where an optical path from the light source to the polygon mirror has a straight line shape, there is also known a light scanning device, as another example, having a configuration where a reflection mirror is located in the optical path to constitute an optical path in a polygonal line shape.

SUMMARY

A light scanning device according to one aspect of the disclosure includes a light source, a deflector, a reflection mirror, and a light width regulating portion. The light source includes a plurality of light-emitting elements located at intervals one another in a predetermined direction. The deflector deflects to scan by reflecting a plurality of light beams, the plurality of light beams being emitted from the respective light-emitting elements. The reflection mirror is located in an optical path between the light source and the deflector. The reflection mirror guides the plurality of light beams emitted from the plurality of light-emitting elements to the deflector. The light width regulating portion regulates widths of the plurality of light beams reflected by the reflection mirror in a main-scanning direction. The light width regulating portion is located adjacent to a reflecting surface of the reflection mirror and includes a pair of regulating wall portions located opposed one another in the main-scanning direction.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes embodiments of the disclosure with reference to the drawings in detail. The disclosure is not limited to the following embodiments.

Image Forming Apparatus

Figure 1:
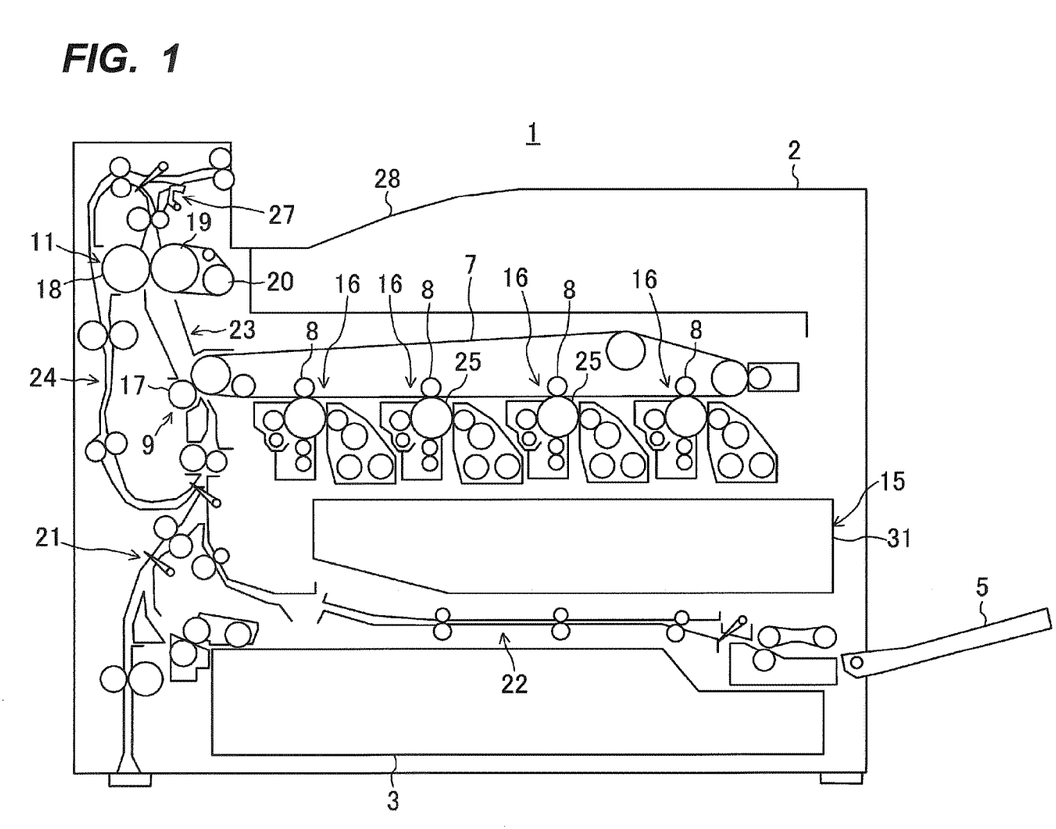
FIG. 1 illustrates a schematic configuration of a cross section of an image forming apparatus according to one embodiment.

FIG. 1 illustrates a schematic configuration of a cross section of an image forming apparatus 1. The image forming apparatus 1 is, for example, a tandem type color printer and includes, as illustrated in FIG. 1, an intermediate transfer belt 7, primary transfer units 8, a secondary transfer unit 9, a fixing unit 11, a light scanning device 15, and a plurality of image forming units 16.

In a lower portion inside a main body 2 of the image forming apparatus 1, a sheet feed cassette 3 is located. The sheet feed cassette 3 internally loads and houses sheets (not illustrated) such as paper sheets before printing. At a side of the sheet feed cassette 3, a first paper sheet conveyor 21 is located. The first paper sheet conveyor 21 receives a paper sheet fed from the sheet feed cassette 3 to convey the paper sheet to the secondary transfer unit 9 located above.

On a right side of the sheet feed cassette 3, a manual paper feed tray 5 is located. On a left side of the manual paper feed tray 5, a second paper sheet conveyor 22 is located. The second paper sheet conveyor 22 receives, for example, a paper sheet fed from the manual paper feed tray 5 to convey to the first paper sheet conveyor 21.

The light scanning device 15 is located above the second paper sheet conveyor 22 and irradiates the image forming units 16 with laser beams based on image data received by the image forming apparatus 1. For example, the four image forming units 16 are located above the light scanning device 15. Above the respective image forming units 16, the endless intermediate transfer belt 7 is located. The intermediate transfer belt 7 is wound around a plurality of rollers and is rotatably driven by a driving device (not illustrated).

As illustrated in FIG. 1, the four image forming units 16 are located along the intermediate transfer belt 7 in one row and form respective toner images of yellow, magenta, cyan, and black. That is, the respective image forming units 16 form electrostatic latent images of a document image on respective photoreceptor drums 25 in accordance with the laser beams irradiated by the light scanning device 15, and these electrostatic latent images are developed to form toner images of the respective colors.

The primary transfer units 8 are located above the respective image forming units 16. The primary transfer units 8 include transfer rollers that primarily transfer the toner images formed by the image forming units 16 on a surface of the intermediate transfer belt 7.

Then, the intermediate transfer belt 7 is rotatably driven, and the toner images of the respective image forming units 16 are transferred to the intermediate transfer belt 7 at predetermined timings. This forms a color toner image on the surface of the intermediate transfer belt 7. The color toner image is a toner image where toner images of four colors including magenta, cyan, yellow, and black are superimposed one another.

As illustrated in FIG. 1, the secondary transfer unit 9 includes a transfer roller 17 located on a left side portion of the intermediate transfer belt 7. Then, the secondary transfer unit 9 applies a transfer bias voltage, which has the reverse polarity to the polarity of the toners, to the paper sheet conveyed from the first paper sheet conveyor 21, so as to transfer the toner images from the intermediate transfer belt 7 to the paper sheet.

The fixing unit 11 is located above the secondary transfer unit 9. Between the secondary transfer unit 9 and the fixing unit 11, there is formed a third paper sheet conveyor 23 that conveys the paper sheet, on which the toner images have been secondarily transferred, to the fixing unit 11. The fixing unit 11 includes a pressure roller 18, a fixing roller 19, and a heating roller 20. Then, the fixing unit 11 applies heat and pressure to the paper sheet conveyed from the third paper sheet conveyor 23 to fix the toner images on the paper sheet.

Above the fixing unit 11, a branching portion 27 is located. When duplex printing is not performed, the paper sheet discharged from the fixing unit 11 is discharged from the branching portion 27 to a paper sheet discharge unit 28 formed on the upper portion of the image forming apparatus 1. When duplex printing is performed, the paper sheet is conveyed from the branching portion 27 to the secondary transfer unit 9 again via a fourth paper sheet conveyor 24.

Light Scanning Device

Figure 2:
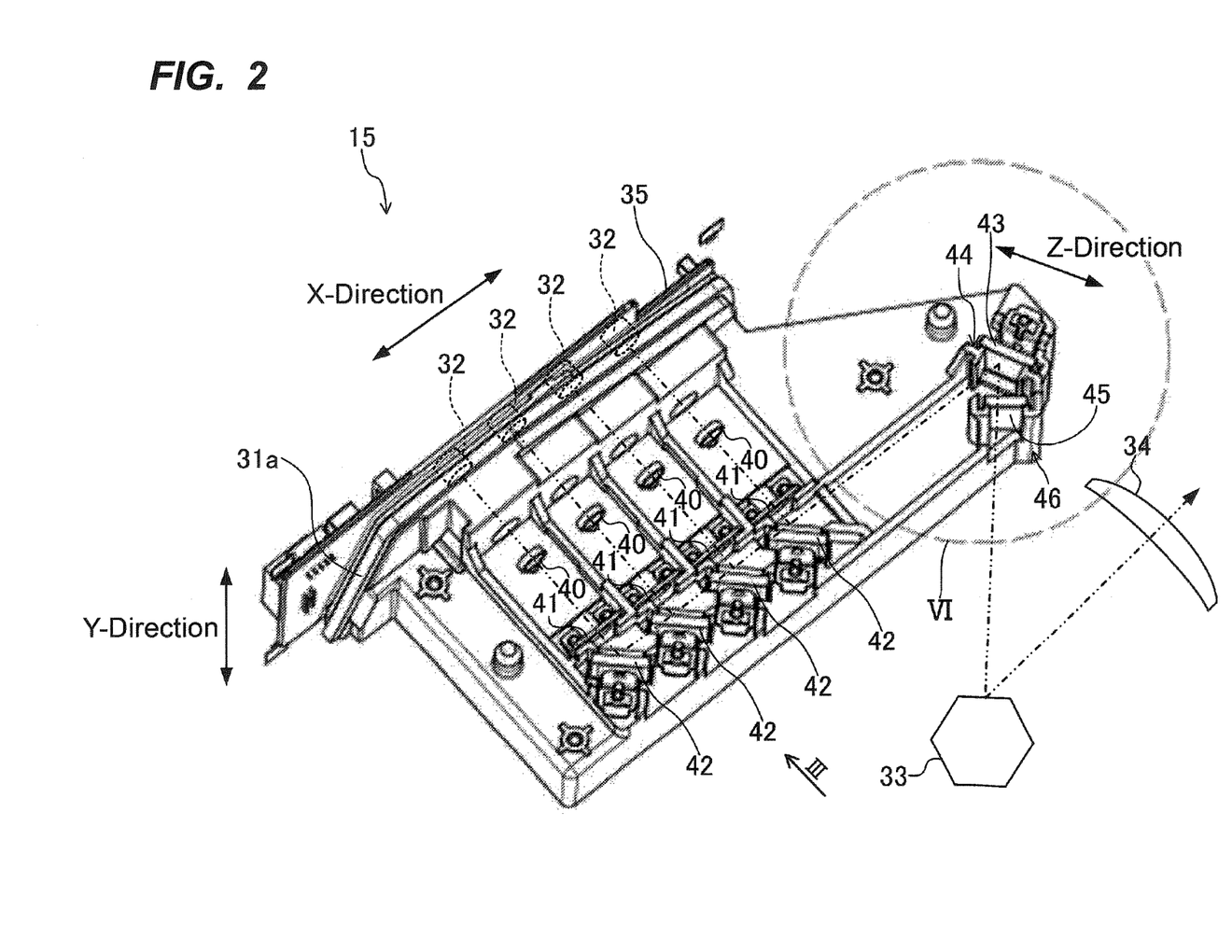
FIG. 2 obliquely illustrates an enlarged view of a light scanning device according to the one embodiment.

As illustrated in FIG. 2, the light scanning device 15 includes a plurality of light sources 32, a polygon mirror 33, and a housing 31 (illustrated in only FIG. 1) having a box shape. The polygon mirror 33 is a deflector that deflects to scan the respective laser beams emitted from the plurality of light sources 32. The housing 31 houses the polygon mirror 33.

The polygon mirror 33 is located in a bottom portion of the housing 31 via a polygon motor (not illustrated). The polygon mirror 33 is a polygon mirror that is rotatably driven by the polygon motor.

The housing 31 internally houses an imaging lens (fθ lens) 34 located in optical paths of the lights reflected by the polygon mirror 33. The imaging lens 34 is installed in the bottom portion of the housing 31 at a side of the polygon mirror 33.

The plurality of light sources 32 are mounted and secured to a sidewall portion 31a of the housing 31. The four light sources 32 in total are located corresponding to the number of reference colors (the four colors of yellow, magenta, cyan, and black in the embodiment) used in the image forming apparatus 1. The light sources 32 each have an approximately columnar shape and are mounted on a substrate member 35.

Figure 4:
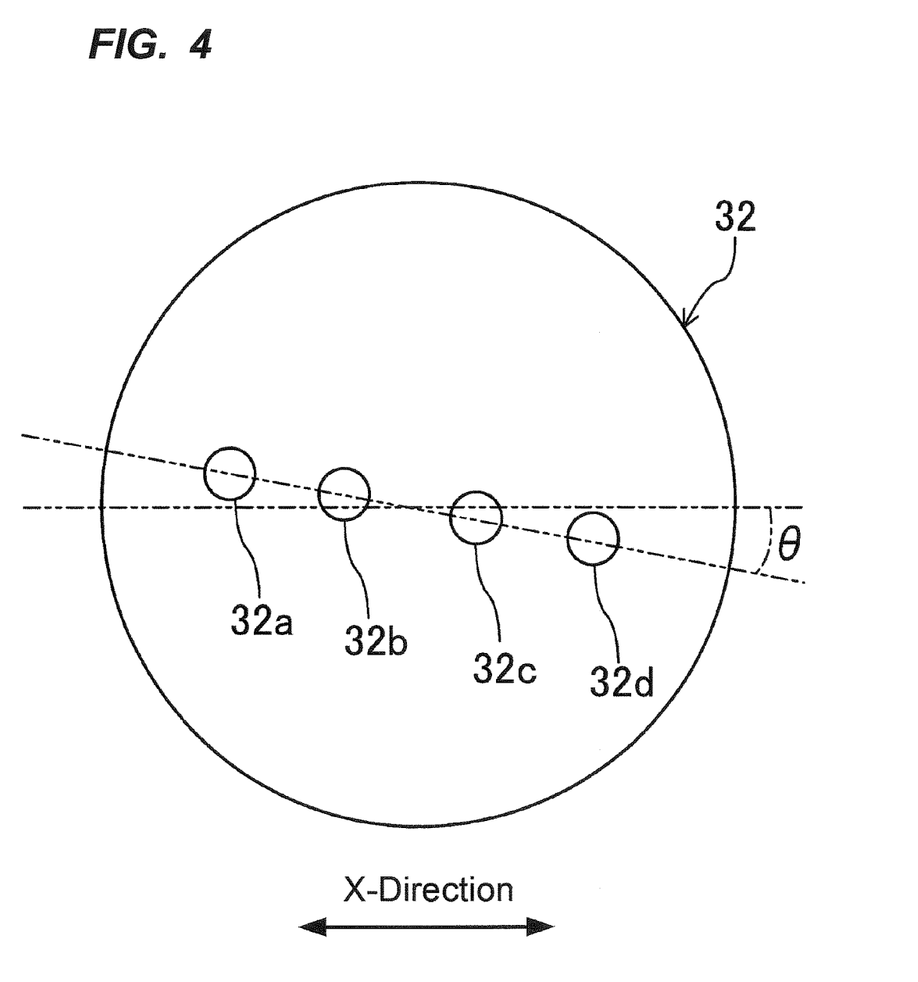
FIG. 4 illustrates a light source according to the one embodiment from a distal end side in an axial direction.

The light sources 32 each have a distal end portion where a plurality (in the embodiment, for example, four) of light-emitting elements 32a to 32d that emit the laser beams are located. As illustrated in FIG. 4, the four light-emitting elements 32a to 32d are located at intervals one another in a predetermined direction inclined by a predetermined angle θ with respect to an X-direction corresponding to a main-scanning direction. The predetermined angle θ is an angle larger than 0 degree, and is, for example, 10 degree in the embodiment. In the substrate member 35, wirings (not illustrated) electrically connected to the terminals of the respective light-emitting elements 32a to 32d are formed.

Figure 3:
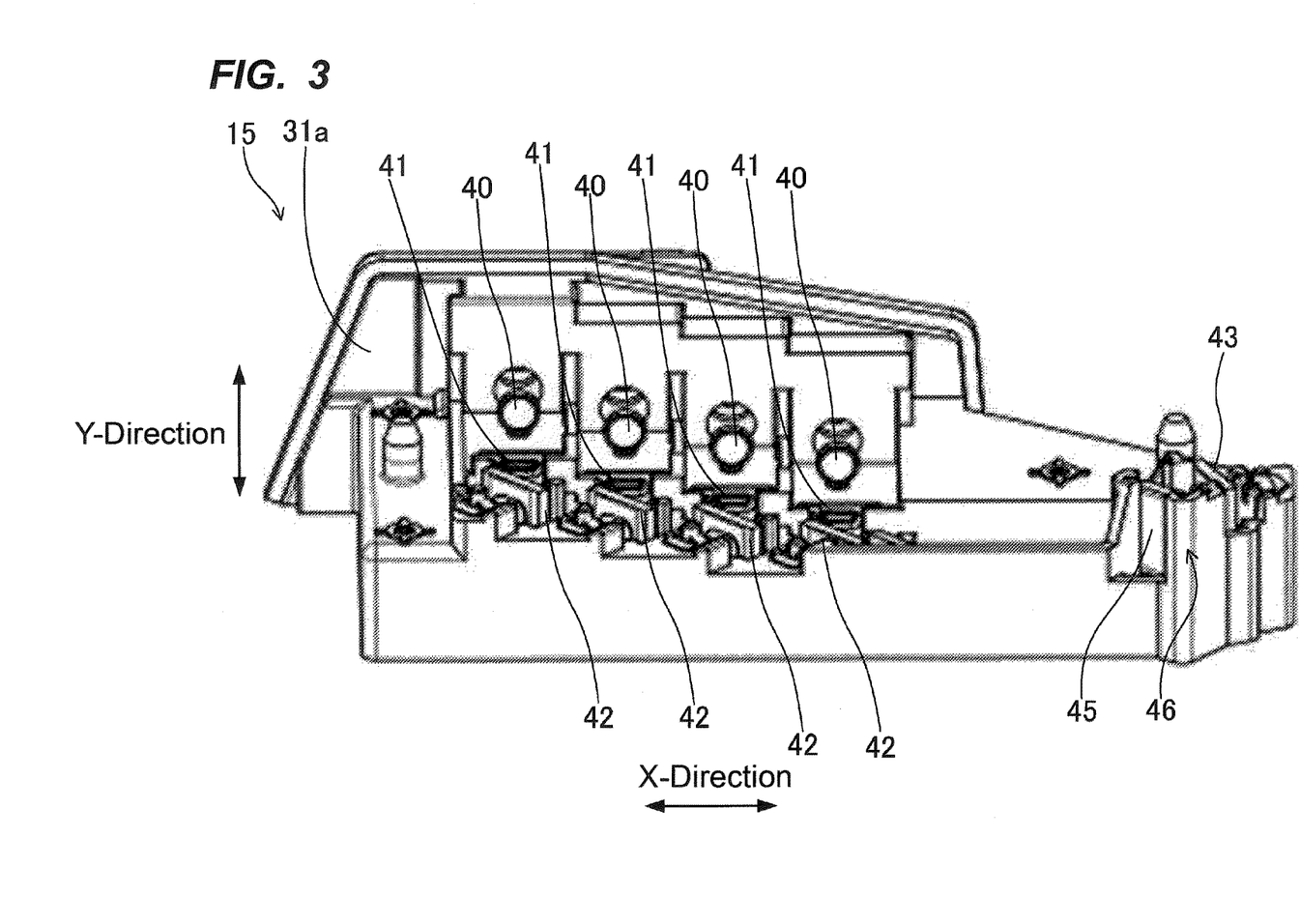
FIG. 3 illustrates III direction arrow view of FIG. 2.

As illustrated in FIG. 2, in the optical path between the respective light sources 32 and the polygon mirror 33, collimator lenses 40, apertures 41, first reflection mirrors 42, a second reflection mirror 43, a light width regulating portion 44, and a cylindrical lens 45 are located. As illustrated in FIG. 3, the light sources 32, the collimator lenses 40, the apertures 41, and the first reflection mirrors 42 are located so as to have different heights from the bottom surface of the housing 31 for the respective optical paths.

The collimator lenses 40 are lenses for converting a plurality of laser beams L1 to L4 (see FIG. 5) emitted from the light-emitting elements 32a to 32d of each of the light sources 32 into collimated lights.

The apertures 41 regulate expanded widths of the plurality of laser beams L1 to L4, which are emitted from the light-emitting elements 32a to 32d of each of the light sources 32, in a height direction (the Y-direction in FIG. 2). The apertures 41 include slit-shaped holes bored on plate-shaped materials perpendicular to the shaft centers of the respective light sources 32. The first reflection mirrors 42 are located inclined by approximately 45 degree with respect to axis lines of the above-described light sources 32 such that an angle between an incident light and an emitted light is 90 degree. The second reflection mirror 43 is located parallel to the first reflection mirrors 42 on the line orthogonal to the axis lines of the light sources 32. The light width regulating portion 44 is located adjacent to the reflecting surface of the second reflection mirror 43. The light width regulating portion 44 regulates expanded widths of the plurality of laser beams L1 to L4 in the direction (herein after referred to as a "Z-direction") corresponding to the main-scanning direction. On the reflecting surface side of the second reflection mirror 43, the cylindrical lens 45 is located at an angle of an acute angle (40 to 45 degrees in the embodiment) with respect to the second reflection mirror 43. The cylindrical lens 45 is a lens for condensing a laser beam group reflected by the second reflection mirror 43 to guide to the polygon mirror 33.

Figure 5:
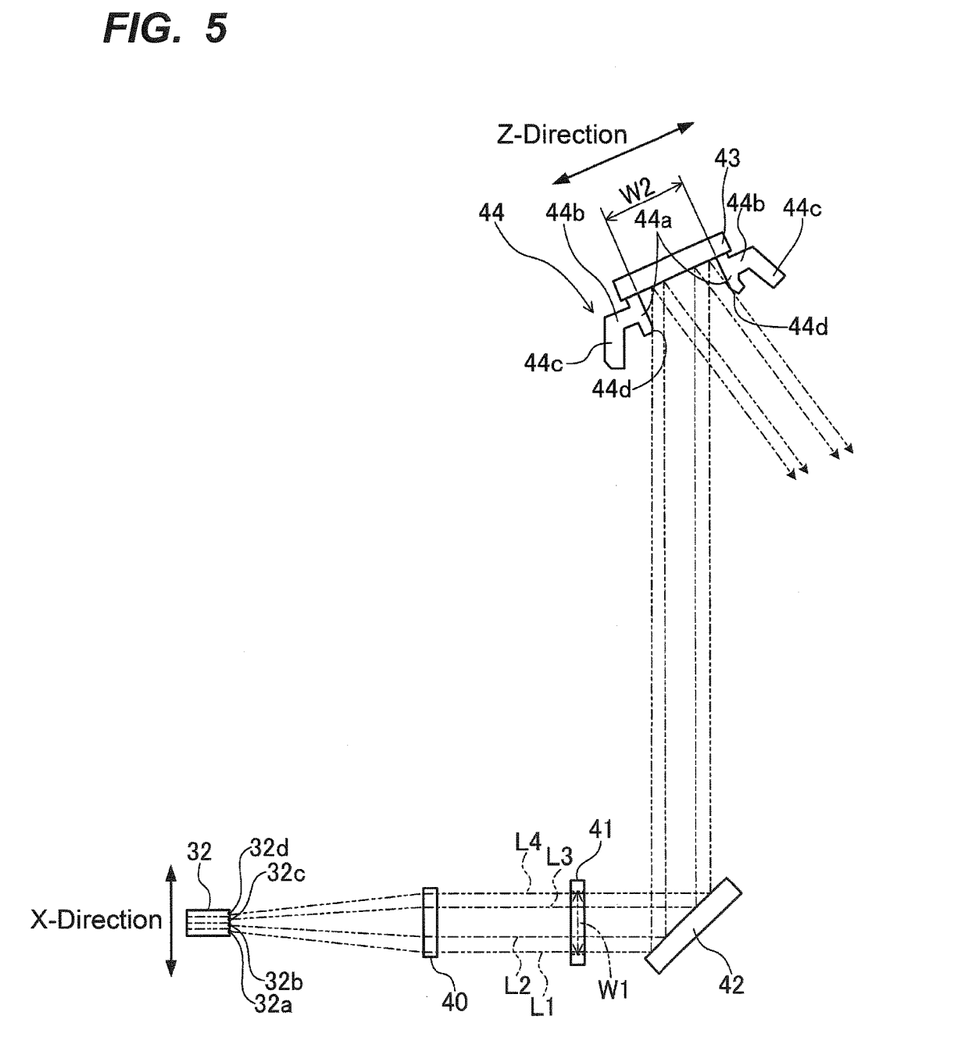
FIG. 5 illustrates a schematic plan view schematically illustrating optical paths of four light beams emitted from the one light source according to the one embodiment.

As illustrated in FIG. 5, the plurality of laser beams L1 to L4, which are emitted from the respective light-emitting elements 32a to 32d of the light sources 32, pass through the apertures 41 after being collimated by the collimator lenses 40. This regulates the expanded widths of the laser beams L1 to L4 in the height direction, and then the laser beams L1 to L4 are reflected by the first reflection mirrors 42. The laser beams L1 to L4, which are reflected by the first reflection mirrors 42, have the expanded widths regulated by the light width regulating portion 44 in the Z-direction to enter the cylindrical lens 45 after being reflected by the second reflection mirror 43. While the drawing is not illustrated, the plurality of laser beams L1 to L4, which enter the cylindrical lens 45, are afterward condensed one another, and then the condensed laser beams L1 to L4 are reflected by the polygon mirror 33 to pass through the imaging lens 34. This forms images on the photoreceptor drums 25.

The scanning lights that have formed the images on the surfaces of the photoreceptor drums 25 scan the surfaces of the photoreceptor drums 25 in the main-scanning direction by rotation of the polygon mirror 33, and scan the surfaces of the photoreceptor drums 25 in a sub-scanning direction by rotation of the photoreceptor drums 25, so as to form electrostatic latent images on the surfaces of the photoreceptor drums 25.

Figure 6:
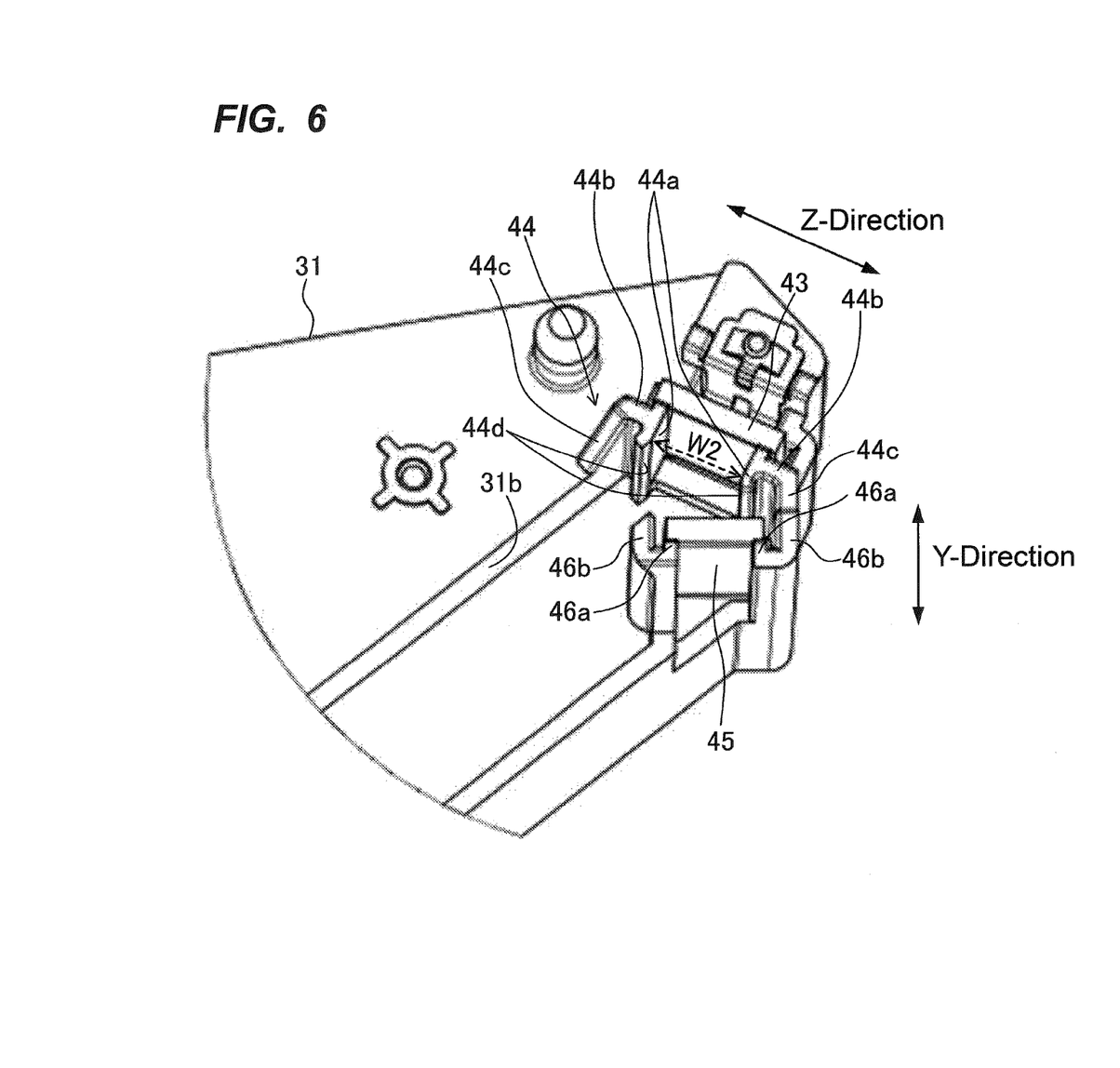
FIG. 6 enlargedly illustrates a VI portion illustrated in FIG. 2.

As illustrated in FIG. 6, the light width regulating portion 44 includes a pair of regulating wall portions 44a, perpendicular wall portions 44b, and inclined wall portions 44c. The perpendicular wall portions 44b and the inclined wall portions 44c are integrally located on the respective regulating wall portions 44a. The light width regulating portions 44 are secured to the second reflection mirror 43 and constitute one unit in combination with the second reflection mirror 43.

The above-described pair of the regulating wall portions 44a have a long-rectangular-plate shape in the height direction (the sub-scanning direction). The pair of regulating wall portions 44a are located opposed one another in a width direction (an arranging direction of the laser beams L1 to L4 on the reflecting surface, that is, the Z-direction in FIG. 6) of the reflecting surface of the second reflection mirror 43. A separation distance W2 between the pair of regulating wall portions 44a is narrower than a width W1 (see FIG. 5) of the slit hole formed on the aperture 41 in the X-direction. One side portion of two side portions, which extend in the height direction of each of the regulating wall portions 44a, is secured to the reflecting surface of the second reflection mirror 43. On edge portions of the other side portions at the optical path side in the respective regulating wall portions 44a, chamfered portions 44d are formed. These chamfered portions 44d are inclined toward the outside of the optical paths as they separate away from the reflecting surface of the second reflection mirror 43. Providing these chamfered portions 44d enables the accurate regulation of the expanded widths of the laser beams L1 to L4 in the Z-direction. In the embodiment, the inclination angles of these chamfered portions 44d are set to, for example, 15 to 30 degrees.

The above-described perpendicular wall portions 44b are perpendicularly connected to the surfaces, which are outside the optical paths, of the pair of regulating wall portions 44a. The inclined wall portions 44c are connected to end portions of the perpendicular wall portions 44b. These end portions are located opposite to the regulating wall portion 44a sides. The inclined wall portions 44c are inclined toward the outside of the optical paths as they separate away from the reflecting surface of the second reflection mirror 43. The inclined wall portion 44c located on the regulating wall portion 44a close to the cylindrical lens 45 among the pair of regulating wall portions 44a is continuously connected to an L-shaped wall portion 46b of a lens holder 46 holding the cylindrical lens 45. The L-shaped wall portion 46b is connected to a supporting wall portion 46a supporting a back side of the cylindrical lens 45. The inclined wall portion 44c located on the regulating wall portion 44a far from the cylindrical lens 45 is continuously connected to a wall surface portion 31b, which forms the optical paths, formed on a bottom wall portion of the housing 31. This maintains light shielding and confidentiality of the optical paths.

Here, in the light scanning device, an aperture constituted of a plate-shaped material in which a hole is bored may be employed as means corresponding to the light width regulating portion 44. However, when the first and second reflection mirrors are located on the optical paths as described in this embodiment, the aperture might not be located at an original intended position because a position at which the aperture is attempt to be located overlaps with a position of a reflection mirror (the second reflection mirror 43 in the embodiment).

In this case, in order to solve this problem, the aperture is brought closer to the polygon mirror side or away from the polygon mirror with respect to the intended position. However, in the former case, since the distance from the light sources to the aperture becomes long, this causes the plurality of laser beams to expand in the Z-direction before reaching the aperture. This causes a problem in which the ratio of the laser beams that pass through the aperture decreases. On the other hand, in the latter case, since the distance from the aperture to the polygon mirror becomes long, this causes the large expanded widths of the respective laser beams in the arranging direction after the laser beams pass through the aperture. This results in a problem in which the ratio of the laser beams that enter the reflecting surface of the polygon mirror decreases.

In contrast to this, in the embodiment, the light width regulating portion 44, which includes the pair of regulating wall portions 44a, is located to regulate the expanded widths of the respective laser beams L1 to L4 in the Z-direction. This regulates the expanded widths of the laser beams L1 to L4, which are reflected by the second reflection mirror 43, in the Z-direction to the width corresponding to the separation distance W2 between the pair of regulating wall portions 44a. Unlike the case where the aperture is employed, it is possible for this light width regulating portion 44 to be located adjacent to the reflecting surface of the second reflection mirror 43. Thus, the second reflection mirror 43 does not restrict the location position of the light width regulating portion 44. This ensures the improved flexible location of the light width regulating portion 44.

The above-described light width regulating portion 44 (the pair of regulating wall portions 44a) is secured to the second reflection mirror 43 and constitutes the one unit in combination with the second reflection mirror 43. Thus, the light width regulating portion 44 and the second reflection mirror 43 are unitized and installed to the housing 31. This ensures an assembly operation to be performed while maintaining the positional relationship (for example, an angle) between the light width regulating portion 44 and the second reflection mirror 43 with high accuracy.

Other Embodiments

While in the above-described embodiment the example where the light scanning device 15 includes the four light sources 32 is described, the light scanning device 15 may include three or less light sources 32 and may include five or more light sources 32. That is, any configuration may be employed insofar as the one light source 32 includes a plurality of light-emitting elements.

While in the above-described embodiment the printer as one example of the image forming apparatus 1 including the light scanning device 15 is described, this should not be construed in a limiting sense. The image forming apparatus 1 may be, for example, a copier, a multi-functional peripheral (MFP), or a facsimile.

As described above, the disclosure is useful for a light scanning device and an image forming apparatus including this light scanning device.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A light scanning device comprising:
    a light source including a plurality of light-emitting elements located at intervals apart from one another in a predetermined direction;
    a deflector that deflects to scan by reflecting a plurality of light beams, the plurality of light beams being emitted from the respective light-emitting elements;
    a reflection mirror located in an optical path between the light source and the deflector, the reflection mirror guiding the plurality of light beams emitted from the plurality of light-emitting elements to the deflector;
    an aperture located in the optical path between the light source and the reflection mirror, the aperture regulating widths of the plurality of light beams in a sub-scanning direction; and
    a light width regulating portion that regulates widths of the plurality of light beams reflected by the reflection mirror in a main-scanning direction,
    wherein the light width regulating portion is located adjacent to a reflecting surface of the reflection mirror and includes a pair of regulating wall portions located opposed one another in the main-scanning direction,
    wherein a separation distance between the pair of regulating wall portions is narrower than a width of a slit hole formed on the aperture in the main-scanning direction.

2. The light scanning device according to claim 1, wherein the pair of regulating wall portions is secured to the reflection mirror to be unitized.

3. The light scanning device according to claim 1, wherein widths of light beams emitted from a plurality of the light sources are regulated by the light width regulating portion.

4. An image forming apparatus comprising the light scanning device according to claim 1.

5. The light scanning device according to claim 1, further comprising:
    a cylindrical lens located in the optical path between the reflection mirror and the deflector, the cylindrical lens condensing the plurality of light beams reflected by the reflection mirror.

* * * * *